United States Patent
Elcan

(10) Patent No.: US 6,388,991 B1
(45) Date of Patent: May 14, 2002

(54) METHOD AND SYSTEM FOR INTERFACING BETWEEN CIRCUIT NETWORK SWITCHES AND ATM EDGE SWITCHES

(75) Inventor: Amie J. Elcan, Superior, CO (US)

(73) Assignee: West Communications International Inc., Denver, CO (US)

( * ) Notice: Subject to any disclaimer, the term of this patent is extended or adjusted under 35 U.S.C. 154(b) by 0 days.

(21) Appl. No.: 09/471,868

(22) Filed: Dec. 23, 1999

(51) Int. Cl.$^7$ .............................. H04J 3/14; H04L 12/66
(52) U.S. Cl. .................... 370/230; 370/356; 370/395.51
(58) Field of Search .................................. 370/230–239, 370/395–399, 351–357, 395.61, 465, 466, 395.51; 379/220, 221, 229, 235, 244, 246

(56) References Cited

U.S. PATENT DOCUMENTS

| | | | |
|---|---|---|---|
| 4,592,048 A | 5/1986 | Beckner et al. ............. 370/354 |
| 5,014,262 A | * 5/1991 | Harshavardhana .......... 370/237 |
| 5,014,266 A | 5/1991 | Bales et al. ................. 370/354 |
| 5,568,475 A | 10/1996 | Doshi et al. | |
| 5,848,053 A | 12/1998 | Ardon | |
| 5,898,689 A | 4/1999 | Kumar et al. ............... 370/232 |
| 5,930,348 A | * 7/1999 | Regnier et al. ............. 379/221 |
| 5,940,491 A | 8/1999 | Anderson et al. | |
| 5,953,338 A | 9/1999 | Ma et al. | |
| 6,137,875 A | * 10/2000 | Mo ............................. 379/241 |
| 6,141,342 A | * 10/2000 | Cheesman et al. .......... 370/352 |
| 6,169,735 B1 | * 1/2001 | Allen, Jr. et al. ........... 370/352 |
| 6,195,714 B1 | * 2/2001 | Li et al. ....................... 710/31 |

* cited by examiner

Primary Examiner—Melvin Marcelo
Assistant Examiner—Soon-Dong Hyun
(74) Attorney, Agent, or Firm—Brooks & Kushman, P.C.

(57) ABSTRACT

A method and system for configuring a class 5 switch of a switch network to support a virtual trunk group to an ATM edge switch of an ATM network while avoiding glare in which the switch provides one trunk group includes initiating an overflow feature of the switch to provide five overflow trunk groups. The primary trunk group of the switch is then provisioned as an outgoing primary trunk group for outgoing calls. One of the five overflow trunk groups is then provisioned as an incoming primary trunk group for incoming calls. The other four overflow trunk groups are provisioned as overflow trunk groups for outgoing and incoming calls. The outgoing primary trunk group is hunted through to seize trunks for outgoing calls and the incoming primary trunk group is hunted through to seize trunks for incoming calls. The other four overflow trunk groups are hunted through in a descending direction to seize trunks for outgoing calls after all of the trunks of the outgoing primary trunk group have been seized. The other four overflow trunk groups are hunted through in an ascending direction to seize trunks for incoming calls after all of the trunks of the incoming primary trunk group have been seized.

17 Claims, 2 Drawing Sheets

METHOD AND SYSTEM FOR INTERFACING BETWEEN CIRCUIT NETWORK SWITCHES AND ATM EDGE SWITCHES

TECHNICAL FIELD

The present invention relates generally to methods and systems for interfacing between circuit network switches and ATM edge switches and, more particularly, to a method and system for interfacing a circuit switch trunk side to support a consolidated trunk group to an ATM edge switch while conforming to existing circuit switch design constraints.

BACKGROUND ART

Current telephone networks as well as their associated transmission media, routing, and cross connection devices are digital circuit switched facilities. Routing of user information, e.g., voice and voice band data services, from a source to a destination is via an end to end switched connection. The connection is dedicated for the duration of a call using the connection. That is, the call is set up over a link interconnecting origination and destination switches. As such, the connection lasts only for the duration of the call.

In telecommunications systems, a vehicle offering a range of different bandwidth services is based on Asynchronous Transfer Mode (ATM) protocols. These protocols define a particular data structure called a cell. A cell is a data packet of a fixed size (53 octets). A cell is formed by a header (5 octets) and payload (48 octets) for transporting routing and user information. In contrast to circuit switched networks, an ATM network shares a connection asynchronously.

A telephony local exchange carrier network includes central offices each of which may be, for example, the No. 5ESS switch available from Lucent. The No. 5ESS switch is described in the *AT&T Technical Journal*, Vol. 64, No. 6, July/August 1985, pages 1303–1564. Many telephony local exchange carriers are planning to evolve from a circuit switched network to an ATM backbone environment to carry voice traffic. In such a telecommunications system, the ATM backbone network connects the central offices. Each central office switch of the circuit network is connected to a respective ATM edge switch of the ATM backbone network. An ATM edge switch is a switch which sits at the edge of the ATM backbone network, providing access from the circuit network to the ATM network.

The circuit switched network in larger metropolitan areas is almost full mesh with point to point trunk groups in multiples of T1s. A trunk group is a group of trunks or circuits that make a connection between two switches. A full mesh network is a network in which each switch has a dedicated connection to all of the other switches. T1 (or DS1) stands for trunk level 1 and is a digital transmission link in which a 1.544 million bits per second are carried to handle 24 voice conversations, i.e., 24 DS0s. A DS0 stands for digital service level 0 and is 64,000 bits per second which is the standard speed for digitizing one voice conversation using pulse code modulation (PCM). Thus, for an area with 40 switches the full mesh network includes roughly 40*39/2=780 separate trunk groups that must be managed and provisioned. There may be more than one trunk group between switches.

Class 5 switches such as the No. 5ESS switch can handle trunk groups having up to approximately 2,000 (1,952) trunks under existing switch design constraints. However, what is needed to support a hub type ATM network is a provisioning configuration for interfacing a class 5 switch to support a consolidated trunk group having more than 2,000 trunks to an ATM edge switch.

SUMMARY OF THE INVENTION

Accordingly, it is an object of the present invention to provide a method and system for interfacing a circuit switch to support a consolidated trunk group to an ATM edge switch while conforming to existing circuit switch design constraints.

It is another object of the present invention to provide a method and system for configuring a class 5 switch to support a consolidated trunk group having more than 2,000 trunks to an ATM edge switch.

It is a further object of the present invention to provide a method and system for configuring a class 5 switch to support a large virtual trunk group of up to 11,712 trunks while avoiding glare.

In carrying out the above objects and other objects, the present invention provides a method for configuring a class 5 switch of a switch network to support a virtual trunk group to an ATM edge switch of an ATM network while avoiding glare. The class 5 switch provides one trunk group and has an overflow feature for providing overflow trunk groups. Each trunk group has trunks for handling calls. The method includes initiating the overflow feature of the class 5 switch to provide at least one overflow trunk group. The primary trunk group of the class 5 switch is then provisioned as an outgoing primary trunk group for outgoing calls. One of the overflow trunk groups of the class 5 switch is then provisioned as an incoming primary trunk group for incoming calls. The outgoing primary trunk group is then hunted through to seize trunks for outgoing calls. The incoming primary trunk group is then hunted through to seize trunks for incoming calls.

Preferably, the class 5 switch is a No. 5ESS switch, a Nortel DMS switch, and the like. The at least one overflow trunk group includes at least two overflow trunk groups. The method preferable includes provisioning all of the non-primary trunk groups of the at least two overflow trunk groups as overflow trunk groups for outgoing and incoming calls. An overflow trunk group is hunted through to seize trunks for outgoing calls after all of the trunks of the outgoing primary trunk group have been seized. The overflow trunk group is also hunted through to seize trunks for incoming calls after all of the trunks of the incoming primary trunk group have been seized.

Alternatively, the at least one overflow trunk group includes at least three overflow trunk groups. The method alternatively includes provisioning all of the non-primary trunk groups of the at least three overflow trunk groups as overflow trunk groups for outgoing and incoming calls. A first overflow trunk group is then hunted through to seize trunks for outgoing calls after all of the trunks of the outgoing primary trunk have been seized. A second overflow trunk group is then hunted through to seize trunks for outgoing calls after all of the trunks of the outgoing primary trunk group and the first overflow trunk group have been seized. The second overflow trunk group is then hunted through to seize trunks for incoming calls after all of the trunks of the incoming primary trunk group have been seized. The first overflow trunk group is then hunted through to seize trunks for incoming calls after all of the trunks of the incoming primary trunk group and the second overflow trunk group have been seized.

Further, in carrying out the above objects and other objects, the present invention provides a telecommunications system includes a circuit switch network having a class 5 switch. The class 5 switch provides one trunk group and has an overflow feature for providing at least three overflow trunk groups. An ATM network having an ATM edge switch is connected to the class 5 switch for receiving and transmitting calls to the circuit switch network.

A controller is operable for initiating the overflow feature of the class 5 switch to provide at least one overflow trunk group, for provisioning the primary trunk group of the class 5 switch as an outgoing primary trunk group for outgoing calls, and for provisioning one of the overflow trunk groups of the class 5 switch as an incoming primary trunk group for incoming calls. The controller is further operable for provisioning the non-primary overflow trunk groups as overflow trunk groups for outgoing and incoming calls. The controller is also operable for hunting through the outgoing primary trunk group to seize trunks for outgoing calls, hunting through the incoming primary trunk group to seize trunks for incoming calls, hunting through a first overflow trunk group to seize trunks for outgoing calls after all of the trunks of the outgoing primary trunk group have been seized, and hunting through a second overflow trunk group to seize trunks for incoming calls after all of the trunks of the incoming primary trunk group have been seized.

The controller is further operable for hunting through the second overflow trunk group to seize trunks for outgoing calls after all of the trunks of the outgoing primary trunk group and the first overflow trunk group have been seized and for hunting the first overflow trunk group to seize trunks for incoming calls after all of the trunks of the incoming primary trunk group and the second overflow trunk group have been seized.

The above objects and other objects, features, and advantages of the present invention will be apparent from the following detailed description of the best mode for carrying out the invention when taken in connection with the accompanying drawings.

BEST MODE FOR CARRYING OUT THE INVENTION

An objective of the method and system of the present invention is to accommodate the largest trunk group possible subject to existing No. 5ESS switch design constraints. The alternative to the present invention is to initiate a feature request for the No. 5ESS switch that may require an expensive software modification. The motivation for provisioning large trunk groups is to save on capital costs by increasing the efficiency of the trunk side switch ports. The port efficiency gain is a result of the queuing phenomenon in which fewer switch ports are required to maintain an established grade of service for one large service group rather than for multiple service groups. An additional reason for provisioning larger trunk groups is to minimize operational costs by not assigning and managing destination prefixes to individual small trunk groups. Managing one large trunk group independent of traffic destination and origination requires significantly fewer resources.

Another objective of the method and system of the present invention is to avoid glare. Glare is the simultaneous seizure of trunks or circuits by a pair of switches such as near and far end switches. The circuit hunt type determines how the switch will search the trunk group for an available circuit and the near and far end switch hunt types must be compatible to minimize glare conditions.

Figure 1:
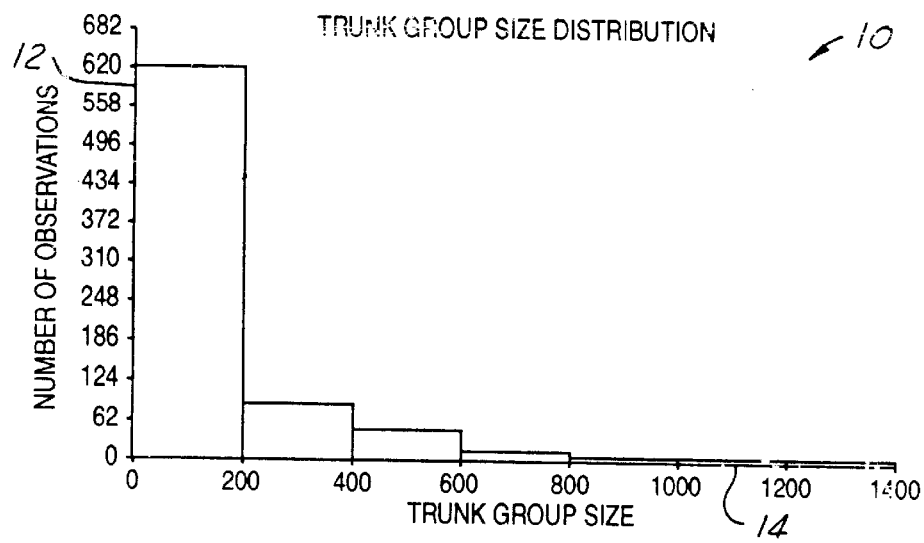
FIG. 1 illustrates a graph of the trunk group size distribution of a typical metropolitan area employing circuit switched networks.

Referring now to FIG. 1, a graph 10 illustrating the trunk group size distribution of a typical metropolitan area employing circuit switched networks is shown. Graph 10 illustrates the number of trunk groups along the y axis 12 versus the trunk group size along the x axis 14. As shown in graph 10, approximately 50% of the local trunk groups in the area include two or fewer T1s (24 DS0s) and about 95% include 19 or fewer T1s (456 DS0s). The largest trunk group is smaller than the current trunk group size constraint for the No. 5ESS switch which is 1,952 trunks.

Figure 2:
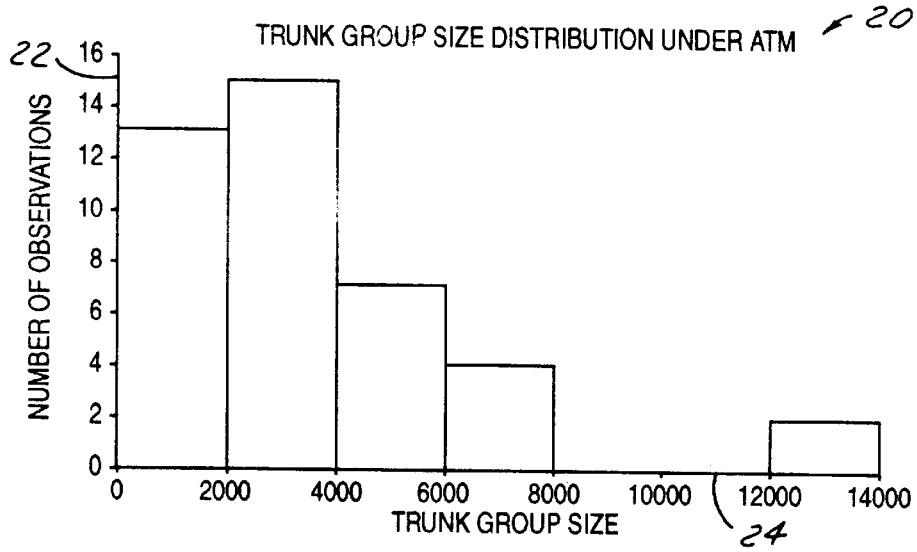
FIG. 2 illustrates a graph of the anticipated distribution of trunk group sizes for the typical metropolitan area once ATM is deployed and trunk groups are consolidated.

Referring now to FIG. 2, a graph 20 illustrating the anticipated distribution of trunk group sizes for the area once ATM is deployed and trunk groups are consolidated is shown. Graph 20 illustrates the number of trunk groups along the y axis 22 versus the trunk group size along the x axis 24. As shown in graph 20 10% of the larger switches have over 7,000 trunks and 50% of the switches have more than 3,000 trunks.

Figure 3:
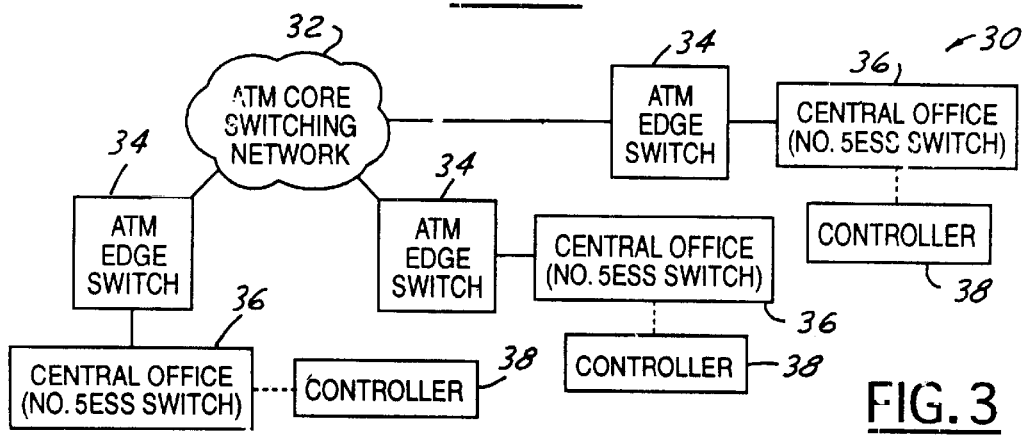
FIG. 3 illustrates a telecommunications network for use with the method and system of the present invention.

Referring now to FIG. 3, a telecommunications network 30 for use with the method and system of the present invention is shown. Network 30 includes an ATM core switching network 32 (or ATM backbone network). ATM core switching network 32 is connected to a plurality of ATM edge switches 34. Each ATM edge switch 34 is connected with a respective circuit switch 36 such as a class 5 switch. The class 5 switch may be a No. 5ESS switch, a Nortel DMS, switch, and the like. Circuit switches 36 communicate with one another through respective ATM edge switches 34 and ATM core switching network 32. Each of circuit switches 36 is associated with a controller 38. Controllers 38 control provisioning and hunting operations of circuit switches 36.

As described above, the No. 5ESS switch is designed to handle one trunk group having no more than 1,952 trunks. The No. 5ESS switch includes an overflow group feature in which additional overflow trunk groups can be used to accommodate more trunks. The practical limit for the number of overflow groups for the No. 5ESS switch is five. Thus, the maximum size virtual trunk group that may be provisioned under current No. 5ESS switch constraints is 11,712 DS0s, i.e., 6 trunk groups*1,952 trunks per trunk group.

The method and system of the present invention will be described with respect to the trunk group configuration of the No. 5ESS switch shown in FIG. 4. The method and system of the present invention create a large virtual trunk group of up to 11,712 trunks while addressing the glare issue and overcome the trunk group limit of 1,952 trunks by using the overflow group feature of the No. 5ESS switch.

In operation, a primary trunk group is first hunted using a particular hunt scheme until all trunks are found to be busy or full. The first associated overflow group is then hunted until all trunks are full. If the first overflow group is full then the second overflow group is hunted and so on. The destination number for each voice call undergoes digit analysis and is assigned a route index based on the prefix dialed. When the trunk group is full the call is assigned the next route index of its associated overflow group.

The concept of the method and system of the present invention is to provision one primary trunk group 42 for outgoing calls and one of the overflow trunk groups for incoming calls. The overflow trunk group for incoming calls is referred to as a primary trunk group 44 for incoming calls. As described above, each primary trunk group has 1,952 trunks and up to 5 overflow trunk groups with up to 1,952 trunks each for a maximum of 11,712 trunks. Overflow trunk groups 46, 48, 50, and 52 are shared by incoming and outgoing calls, but circuits are seized from opposite ends of the switch at the trunk group level and within the trunk group to prevent glare conditions. For instance, overflow trunk group 46 is hunted first for outgoing calls but is hunted last for incoming calls. Similarly, overflow trunk group 52 is hunted last for outgoing calls but is hunted first for incoming calls.

Figure 4:
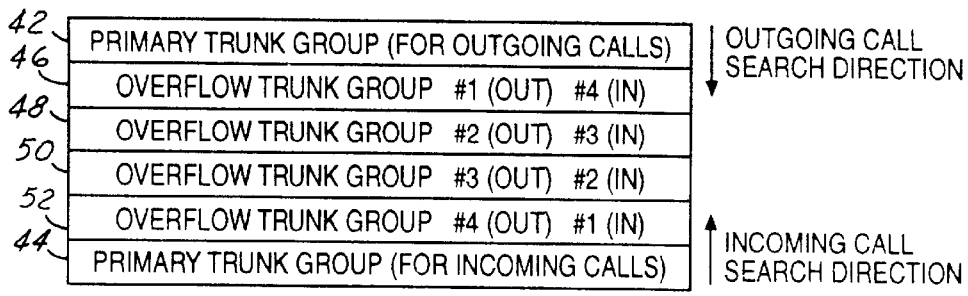
FIG. 4 illustrates a trunk group configuration of the No. 5ESS switch for use with the method and system of the present invention.

The trunk group at the top of FIG. 4 is the primary trunk group 42 for outgoing calls and the last trunk group at the bottom of FIG. 4 is the primary trunk group 44 for incoming calls. Outgoing calls attempt to seize a circuit from primary trunk group 42 and then overflow trunk groups 46, 48, 50, and 52 in a descending direction. Outgoing calls then attempt to seize a circuit from primary trunk group 44 after searching through the overflow trunk groups. Outgoing calls also attempt to seize a circuit from primary trunk group 44 if there are no overflow trunk groups.

Incoming calls attempt to seize a circuit from primary trunk group 44 and then overflow trunk groups 52, 50, 48, and 46 in an ascending direction. Separating the incoming from the outgoing calls in this fashion reduces the frequency of glare conditions. Incoming calls then attempt to seize a circuit from primary trunk group 42 after searching through the overflow trunk groups. Incoming calls also attempt to seize a circuit from primary trunk group 42 if there are no overflow trunk groups.

Figure 5:
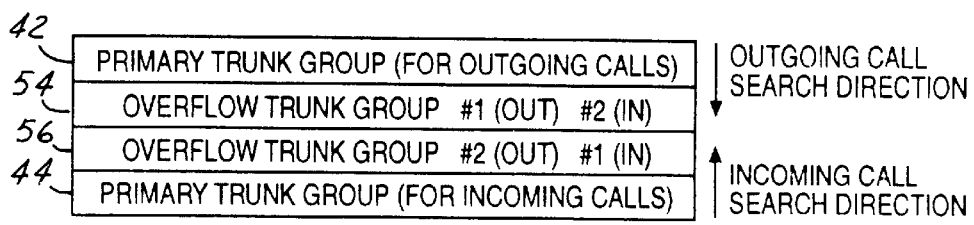
FIG. 5 illustrates an alternative trunk group configuration of the No. 5ESS switch for use with the method and system of the present invention.

Similarly, the hunt types within the trunk groups may be ascending for incoming calls and descending for outgoing calls. The hunt types within the trunk groups may also be another hunt type such as forward/backward circular sequential, uniform call distribution, and two-way forward/backward. In addition to the ascending/descending hunt type between hunt groups other hunt types such as those mentioned above may be used. It is to be appreciated that the positions of the trunk groups shown in FIG. 4 are exemplary. For instance, primary trunk group 42 is not restricted to the top of the switch as shown in FIG. 4. Rather, the position of a trunk group is determined by point codes as is well known. Of course, less than five overflow trunk groups may be employed such as in the configuration shown in FIG. 5. The configuration shown in FIG. 5 includes primary trunk groups 42, 44 and two overflow trunk groups 54, 56.

Figure 6:
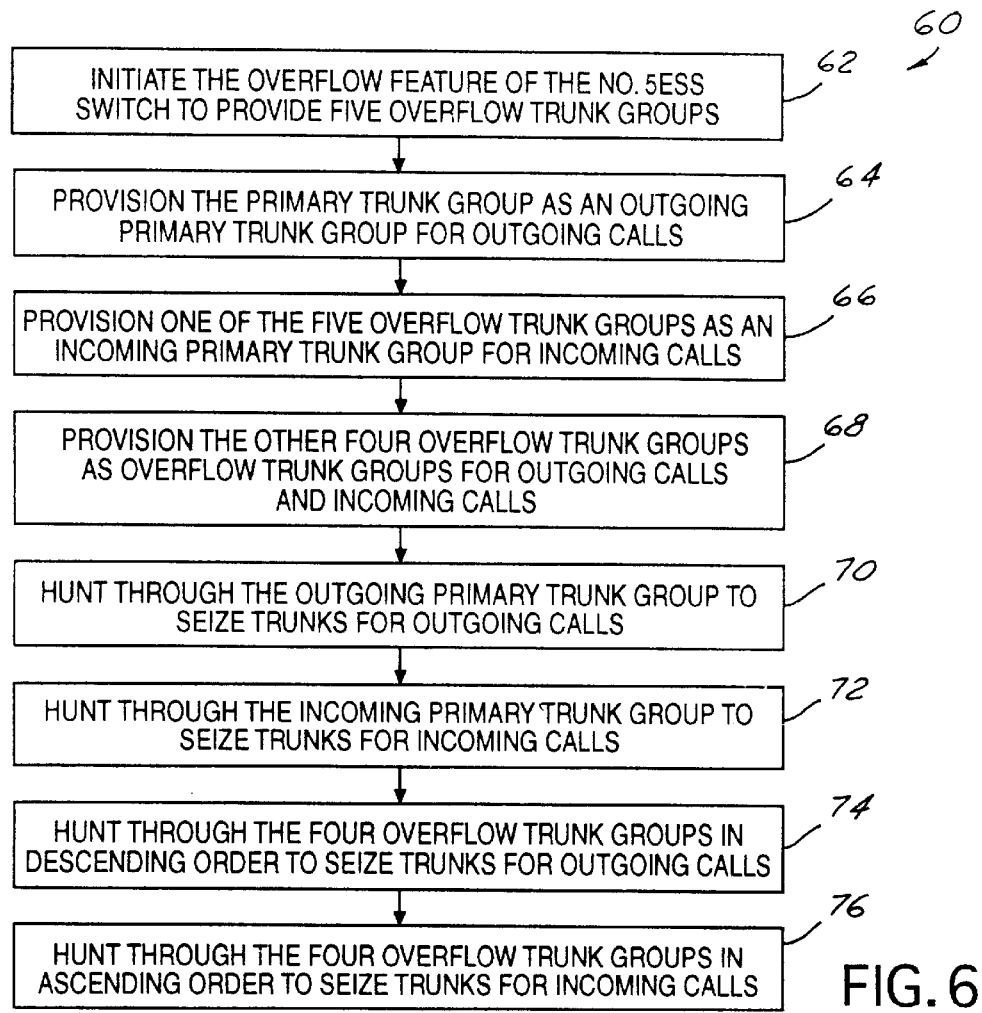
FIG. 6 illustrates a flow chart describing operation of the method and system of the present invention.

Referring now to FIG. 6, a flow chart 60 illustrating operation of the method and system for configuring a No. 5ESS of a switch network to support a virtual trunk group to an ATM edge switch of an ATM network while avoiding glare in accordance with the present invention is shown. Initially, box 62 initiates the overflow feature of the No. 5ESS switch to provide five overflow trunk groups. Box 64 then provisions the primary trunk group of the No. 5ESS switch as an outgoing primary trunk group for outgoing calls. Box 66 then provisions one of the five overflow trunk groups of the No. 5ESS switch as an incoming primary trunk group for incoming calls. Box 68 then provisions the other four of the five overflow trunk groups of the No. 5ESS switch as overflow trunk groups for outgoing and incoming calls. Box 70 then hunts through the outgoing primary trunk group to seize trunks for outgoing calls. Box 72 then hunts through the incoming primary trunk group to seize trunks for incoming calls. Box 74 then hunts through the four overflow trunk groups in descending order to seize trunks for outgoing calls. Box 76 then hunts through the four overflow trunk groups in ascending order to seize trunks for incoming calls.

Thus, it is apparent that there has been provided, in accordance with the present invention, a method and system for configuring a class 5 switch of a circuit switch network to support a virtual trunk group to an ATM edge switch of an ATM network while avoiding glare that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for configuring a class 5 switch of a circuit switch network to support a virtual trunk group to an ATM edge switch of an ATM network while avoiding glare, wherein the class 5 switch provides one primary trunk group and has an overflow feature for providing overflow trunk groups, wherein each trunk group has a plurality of trunks for handling calls, the method comprising:

initiating the overflow feature of the class 5 switch to provide at least one overflow trunk group;

provisioning the primary trunk group of the class 5 switch as an outgoing primary trunk group for outgoing calls;

provisioning one of the at least one overflow trunk groups of the class 5 switch as an incoming primary trunk group for incoming calls;

hunting through the outgoing primary trunk group to seize trunks for outgoing calls;

hunting through the incoming primary trunk group to seize for incoming calls; and hunting through the incoming primary trunk group to seize trunks for outgoing calls after all of the trunks of the outgoing primary trunk group have been seized.

2. The method of claim 1 wherein:
the class 5 switch is a No. 5ESS switch.

3. The method of claim 1 further comprising:
hunting through the outgoing primary trunk group to seize trunks for incoming calls after all of the trunks of the incoming primary trunk group have been seized.

4. The method of claim 1 wherein:
the at least one overflow trunk group includes at least two overflow trunk groups.

5. The method of claim 4 further comprising:
provisioning all of the non-primary trunk groups of the at least two overflow trunk groups as overflow trunk groups for outgoing and incoming calls;

hunting through an overflow trunk group to seize trunks for outgoing calls after all of the trunks of the outgoing primary trunk group have been seized; and hunting through the overflow trunk group to seize trunks for incoming calls after all of the trunks of the incoming primary trunk group have been seized.

6. The method of claim 4 wherein the at least one overflow trunk group includes at least three overflow trunk groups the method further comprising:
provisioning all of the non-primary trunk groups of the at least three overflow trunk groups as overflow trunk groups for outgoing and incoming calls;
hunting through a first overflow trunk group to seize trunks for outgoing calls after all of the trunks of the outgoing primary trunk have been seized; and
hunting through a second overflow trunk group to seize trunks for outgoing calls after all of the trunks of the outgoing primary trunk group and the first overflow trunk group have been seized.

7. The method of claim 6 further comprising:
hunting through the second overflow trunk group to seize trunks for incoming calls after all of the trunks of the incoming primary trunk group have been seized; and
hunting through the first overflow trunk group to seize trunks for incoming calls after all of the trunks of the incoming primary trunk group and the second overflow trunk group have been seized.

8. A method for configuring a No. 5ESS of a switch network to support a virtual trunk group to an ATM edge switch of an ATM network while avoiding glare, wherein the No. 5ESS switch provides one primary trunk group and has an overflow feature for providing overflow trunk groups, wherein each trunk group has a plurality of trunks for handling calls, the method comprising:
initiating the overflow feature of the No. 5ESS switch to provide five overflow trunk groups;
provisioning the primary trunk group of the No. 5ESS switch as an outgoing primary trunk group for outgoing calls;
provisioning one of the five overflow trunk groups of the No. 5ESS switch as an incoming primary trunk group for incoming calls;
provisioning the other four of the five overflow trunk groups of the No. 5ESS switch as overflow trunk groups for outgoing and incoming calls;
hunting through the outgoing primary trunk group to seize trunks for outgoing calls;
hunting through the incoming primary trunk group to seize trunks for incoming calls;
hunting through a first overflow trunk group to seize trunks for outgoing calls after all of the trunks of the outgoing primary trunk group have been seized; and
hunting through a fourth overflow trunk group to seize trunks for incoming calls after all of the trunks of the incoming pry trunk group have been seized.

9. The method of claim 8 further comprising:
hunting through a second overflow trunk group to seize trunks for incoming calls after all of the trunks of the incoming primary trunk group and the first overflow trunk group have been seized.

10. The method of claim 9 further comprising:
hunting through a third overflow trunk group to seize trunks for incoming calls after all of the trunks of the incoming primary trunk group and the first and second overflow trunk groups have been seized; and
hunting through the fourth overflow trunk group to seize trunks for incoming calls after all of the trunks of the incoming primary trunk group and the first, second, and third overflow trunk groups have been seized.

11. The method of claim 9 further comprising:
hunting through a third overflow trunk group to seize trunks for outgoing calls after all of the trunks of the outgoing primary trunk group and the fourth overflow trunk group have been seized; and
hunting through the second overflow trunk group to seize trunks for outgoing calls after all of the trunks of the outgoing primary trunk group and the fourth and third overflow trunk groups have been seized.

12. The method of claim 11 further comprising:
hunting through the first overflow trunk group to seize trunks for outgoing calls after all of the trunks of the outgoing primary trunk group and the fourth, third, and second overflow trunk groups have been seized.

13. A telecommunications system comprising:
a circuit switch network having a switch, the switch providing one primary trunk group and having an overflow feature for providing at least three overflow trunk groups, wherein each trunk group has its for handing calls;
an ATM network having an ATM edge switch connected to the switch for receiving and transmitting calls to the circuit switch network; and
a controller operable for initiating the overflow feature of the switch to provide at least one overflow trunk group, for provisioning the primary trunk group of the switch as an outgoing primary trunk group for outgoing calls, and for provisioning one of the overflow trunk groups of the switch as an incoming primary trunk group for incoming calls, the controller further operable for provisioning the non-primary overflow trunk groups as overflow trunk groups for outgoing and incoming calls, wherein the controller is operable for hunting through the outgoing primary trunk group to seize trunks for outgoing calls, hunting through the incoming primary trunk group to seize trunks for incoming calls, hunting through a first overflow trunk group to seize trunks for outgoing calls after all of the trunks of the outgoing primary trunk group have been seized, and hunting through a second overflow trunk group to seize trunks for incoming calls after all of the trunks of the incoming primary trunk group have been seized.

14. The telecommunications system of claim 13 wherein:
the controller is further operable for hunting through the second overflow trunk group to seize trunks for outgoing calls after all of the trunks of the outgoing primary trunk group and the first overflow trunk group have been seized.

15. The telecommunications system of claim 14 wherein:
the controller is further operable for hunting the first overflow trunk group to seize trunks for incoming calls after all of the trunks of the incoming primary trunk group and the second overflow trunk group have been seized.

16. The telecommunications system of claim 13 wherein:
the at least three overflow trunk groups includes five overflow trunk groups.

17. A method for configuring a No. 5ESS of a switch network to support a virtual trunk group to an ATM edge switch of an ATM network while avoiding glare, wherein the No. 5ESS switch provides one primary trunk group and has an overflow feature for providing overflow trunk groups, wherein each trunk group has a plurality of trunks for handling calls, the method comprising:
initiating the overflow feature of the No. 5ESS switch to provide five overflow trunk groups;

provisioning the primary trunk group as an outgoing primary trunk group for outgoing calls;

provisioning one of the five overflow trunk groups as an incoming primary trunk group for incoming calls;

provisioning the other four of the five overflow trunk groups switch as overflow trunk groups for outgoing and incoming calls;

hunting through the outgoing primary trunk group to seize trunks for outgoing calls;

hunting through the incoming primary trunk group to seize trunks for incoming calls;

hunting through the other four of the five overflow trunk groups in an descending direction to seize trunks for outgoing calls after all of the trunks of the outgoing primary trunk group have been seized; and hunting through the other four of the five overflow trunk groups in an ascending direction to seize trunks for incoming calls after all of the trunks of the incoming primary trunk group have been seized.

* * * * *